United States Patent [19]
Herglotz

[11] 3,743,841
[45] July 3, 1973

[54] METHOD OF DUAL WAVELENGTH X-RAY ANALYSIS

[75] Inventor: Heribert K. Herglotz, Wilmington, Del.

[73] Assignee: E. I. du Pont de Nemours and Company, Wilmington, Del.

[22] Filed: May 25, 1971

[21] Appl. No.: 146,755

[52] U.S. Cl. .............................. 250/273, 250/321
[51] Int. Cl. ........................................... G01n 23/20
[58] Field of Search ..................... 250/51.5, 65 R; 313/56

[56] References Cited
UNITED STATES PATENTS

| | | | |
|---|---|---|---|
| 3,502,925 | 4/1970 | Herglotz | 313/55 |
| 3,336,494 | 8/1967 | Nagashima | 250/51.5 |
| 3,248,543 | 4/1966 | Pitchford | 250/51.5 |

Primary Examiner—James W. Lawrence
Assistant Examiner—C. E. Church
Attorney—Harry J. McCauley

[57] ABSTRACT

A method of dual wavelength X-ray analysis comprising concurrently irradiating a sample in analysis with beams of X-radiation preselected as to wavelength to produce separate diffraction patterns characteristic, respectively, of the atomic crystallographic order and the supramolecular order, and recording the patterns.

9 Claims, 14 Drawing Figures

Patented July 3, 1973 3,743,841

INVENTOR
Heribert K. Herglotz
BY
Harry J. McCauley
ATTORNEY

Inventor
Heribert K. Herglotz

FIG. 8

METHOD OF DUAL WAVELENGTH X-RAY ANALYSIS

BRIEF SUMMARY OF THE INVENTION

Generally, this invention comprises a method of dual wavelength X-ray analysis for the simultaneous investigation of the existing atomic crystallographic order and supramolecular order of a sample material consisting of concurrently irradiating the sample material with two well-collimated, high intensity, substantially coincident and monochromatic X-ray beams, one of which beams is of relatively short wavelength producing a diffraction pattern characteristic primarily of the atomic crystallographic order and the other of which beams is of relatively long wavelength producing a diffraction pattern characteristic primarily of the supramolecular order, and recording each diffraction pattern.

DRAWINGS

The following drawings illustrate a preferred embodiment of the invention, in which.

INTRODUCTION

Physical properties of materials are now known to be dependent upon at least two levels of organization of the molecular structure within the materials. The atomic crystallographic order, which is the small scale arrangement of basic building blocks of a material, is the structural level which was revealed by X-ray diffraction in the early part of the 20th century, and this has been studied intensively for most known materials. More recently, a level of organization of molecular structure involving multiple crystallographic units or molecules existing on an ordered basis has been recognized, particularly in polymeric materials, this level being denoted "supramolecular."

X-ray diffraction in ordered structure is evaluated by applying Bragg's Law, which can be stated:

$$\sin \theta = n\lambda/2d$$

where
$n$ = the order of diffraction
$\lambda$ = wavelength of X-radiation
$d$ = periodicity-spacing
$\theta$ = angle of diffraction (Bragg angle)

The wavelengths which have been found most useful for study of atomic crystallographic order in materials have been in the 0.5–2.0A range. Periodicities associated with the atomic crystallographic order have been found to have normal values in the 0.5–10A range, which produces Bragg angles ranging from 4°–30° in the wavelength range supra. Since diffraction patterns are diverted from the main beam at twice the Bragg angle, this is a range easily analyzed in diffraction patterns.

The situation is quite different as regards the periodicities or repetitive features associated with supramolecular order, where the dimensional range is 100–1,000A. Such periodicities are barely detectable using the 0.5–2.0A wavelengths, since Bragg angles of only 1' to 35' result. Thus, these diffraction pattern features lie within 2' to 1° from the primary beam and are therefore very difficult to resolve.

The X-ray source of applicant's U.S. Pat. No. 3,502,925 permits probing the supramolecular order, since it produces a high intensity X-ray beam of 8.34A. At this wavelength the periodicities associated with supramolecular order produce Bragg angles ranging from 15' to 2.5°, or diffraction patterns which are deviated 0.5°–5° from the primary beam, so that resolution is greatly improved.

The supramolecular order may also involve a level of organization of molecular structure which, for example, has a nonhomogeneous electron density distribution within the material which is responsible for X-ray scattering at very small angles. For this case also, long wavelength X-rays are required to produce a pattern that can be easily analyzed. Studies by A. Guinier and others (summarized in Chapter 12 of "X-Ray Diffraction Procedures" by Klug and Alexander, John Wiley & Sons, 1954) have provided theory and analysis methods for the small angle X-ray scattering resulting from certain forms of supramolecular order which augment the Bragg Law analysis for periodic or repetitive features. In the discussion that follows, it will be understood that when diffraction and/or diffraction patterns are discussed, X-ray scattering and associated patterns are also to be considered as included in the discussion.

Unfortunately, the use of longer wavelengths in the study of supramolecular periodicities or scattering centers requires that a separate or additional study be made at shorter wavelengths to permit analysis of the atomic crystallographic order. This can be seen by realizing that radiation at 8.32A cannot be diffracted by periodicities of 4A or less (e.g., $\sin \theta = \lambda/2d = 8.32/8$, which does not exist).

Knowledge of both the atomic crystallographic and supramolecular orders of organization and the changes that take place in each in the course of, or resulting from, the processing or treatment of materials is valuable for product characterization and development.

Changes in these types of order or organization can be indicative of the state of physical properties of materials, such as hardness, tenacity, porosity, brittleness, dyeability and the like. The ability to make a simultaneous investigation of both orders of organization in the same region of a sample would permit study of the interrelationship between the two orders resulting from material treatment or processing which is not possible from separate studies.

THE INVENTION

I have now found that a sample of material can be irradiated with an X-ray beam containing two substantially monochromatic wavelengths, one in the general 1A wavelength range and the other in the general 10A wavelength range. Then, simultaneous recording of the diffracted or scattered radiation of both wavelengths gives information about the structural details of the sample from the several thousand A range down to the range of fractions of an A. Simultaneous exposure of one or more photographic films is a convenient method of recording diffraction patterns; however, employing a goniometric scanner with digital counting and recording equipment, for example, is equally practicable.

Production of a well-collimated dual wavelength X-ray beam is accomplished by utilizing a cavity-type target which contains two elements each capable of emitting, under electron bombardment, a predetermined wavelength such that, upon irradiation of the sample, the wavelength produced by one element gives the diffraction pattern characteristic of atomic crystallographic order whereas the wavelength produced by the other element gives the diffraction pattern characteristic of supramolecular order.

In one embodiment, the target contains aluminum and copper which emit characteristic wavelengths of 8.34A(Al) and 1.54A(Cu). Since the X-ray beam from this improved tube contains two essentially monochromatic wavelengths in a highly collimated beam, simultaneous short and long wavelength diffraction data are produced from the same sample region under identical geometric sample position conditions. The diffraction data thus produced is superior to that obtained with separate studies, since the interrelationship between the two structural orders of the sample material due to process conditions is clearly revealed without any interference arising out of sample geometric alignment or position in the X-ray beam.

Figure 1A:
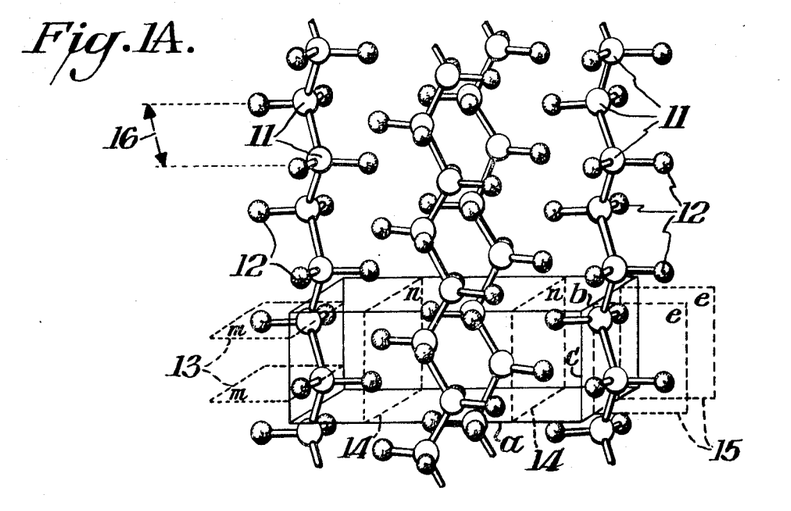
FIG. 1A is a diagrammatic representation of a typical molecular model, indicating the dimensional magnitude of crystallographic order.
Figure 1B:
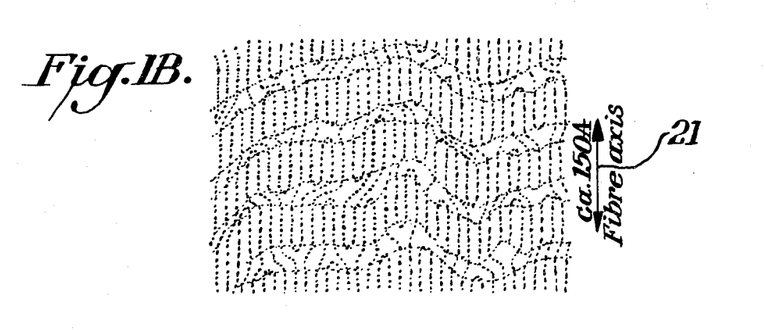
FIG. 1B is a diagrammatic representation of adjacent long-chain polymer molecules, indicating the dimensional magnitude of supramolecular order.

Referring to FIGS. 1A and 1B, the crystallographic order is depicted in FIG. 1A as a familiar pictorial molecular model of carbon atoms 11 and hydrogen atoms 12. Repetitive features which produce diffraction maxima lie in planes such as the typical examples denoted 13, 14 and 15. The distance between adjacent carbon atoms is indicated at 16, which is, typically, 1.54A.

In contrast, one form of supramolecular order of long chain polymer molecules is depicted in FIG. 1B. Here a repetitive feature occurs from a somewhat ordered chain folding with a spacing as shown at 21, typically about 150A for polypropylene as an example.

Effective simultaneous evaluation of both of these structural orders requires the use of at least two monochromatic wavelengths, one of which is a short wavelength and one of which is a relatively long wavelength. Thus, a target is necessary which is capable of emitting a well-collimated X-ray beam containing the two or more monochromatic wavelengths required to reveal the structural orders of interest.

X-ray targets emitting two nearly monochromatic wavelengths can be provided in various ways. For example, the K- and L-radiations or the L- and M-radiations of several elements are in the useful wavelength ranges required. An alloy composed of two preselected elements can emit characteristic wavelengths in the desired ranges; or a target can be fabricated of two separate elements associated in a structure such that both are simultaneously excited and the X-rays emitted from both elements collimated and caused to impinge on the sample. The target elements should additionally possess good thermal conductivity and reasonably high melting points.

Table I lists a number of element combinations with the respective characteristic wavelengths of each.

TABLE I

| Element I | Type of Radiation | $\lambda_1(A)$ | Element II | Type of Radiation | $\lambda_2(A)$ |
|---|---|---|---|---|---|
| Ag | K | 0.48 | Ag | L | 4.15 |
| Mo | K | 0.71 | Mo | L | 5.4 |
| Th | L | 0.95 | Th | M | 4.14 |
| Au | L | 1.27 | Au | M | 5.84 |
| W | L | 1.47 | W | M | 6.97 |
| Ta | L | 1.52 | Ta | M | 7.24 |
|  |  |  | Al | K | 8.34 |
|  |  |  | Mg | K | 9.89 |
| Cu | K | 1.54 | Cu | L | 13.36 |
| Fe | K | 1.94 |  |  |  |

The use of a single one of the heavy elements (e.g., Th, W or Ta) for emission of both short and long wavelengths from the characteristic L–M emission is not preferred, because the complexity of the higher spectra makes it difficult to produce wavelengths of the required monochromaticity.

Table I also shows that several elements (e.g., Ag, Mo and Cu) can be used for emission of both short and long wavelengths from the characteristic K–L emissions.

Accordingly, copper was used as a single element-dual wavelength target which, as listed in Table I, has a characteristic K-emission of 1.54A and an L-emission of 13.36A with a ratio of wavelengths $\lambda_2/\lambda_1 = 13.36/1.54 = 8.7$. The X-ray source employed was of the conical cavity target design taught in applicant's U.S. Pat. No. 3,502,925. Satisfactory performance was not readily achieved due to several complications. Because longer wavelengths are absorbed to a relatively greater extent, the L-emission of 13.36A suffered heavy absorption in the foil window of the tube and in the sample itself. In addition, an operating potential was not readily found which gave a reasonable balance of radiation intensities at both wavelengths.

The problem of absorption of the long wavelengths emission is not as serious if Mo is used as a single elementdual wavelength target. However, selection of an operating potential to provide a balance of radiation intensities of both the K- and L-radiation still presents some difficulty.

The same is true when using Ag as a target material. Moreover, although the L-radiation of Ag is 4.15A, or nearly three times the 1.54A K-radiation of Cu, it is only 50 percent as effective as the 8.34A K-radiation of Al for resolving structural features having periodicities in the 50A – 1,000A range.

Figure 2A:
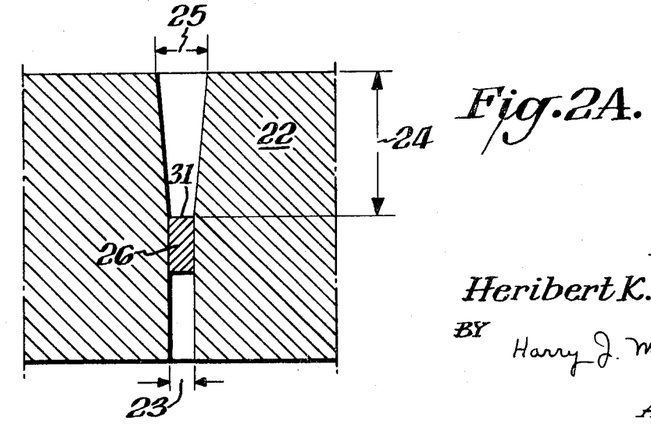
FIG. 2A is a partially schematic side-elevational, cross-sectional view of a preferred embodiment of composite cavity target which can be employed in the practice of this invention.

From experience to date, the preferred target configuration is that detailed in FIG. 2A. The target block 22 is drilled through with a bore, typically, 0.33 mm dia., as denoted at 23. A frusto-conical cavity is then formed on the side of the target subjected to electron bombardment by reaming this hole with a tapered reamer to a depth 24, typically, 2 mm., and with large diameter 25, typically, 0.75 mm. A metallic plug 26 is pushed past the tapered entrance into a force fit within cylindrical bore 23, to a point where the upper face 31 is essentially even with the bottom of the taper. Using this construction, a dual element target can be obtained by fabricating target block 22 from a preselected element emitting one of the desired wavelengths and the plug 26 from a different preselected element emitting the other of the desired wavelengths. Table II illustrates several useful combinations of target materials for dual wavelength analyses.

TABLE II

| | Target Block (22) | Plug (26) | Wavelength Ratio |
|---|---|---|---|
| 1 | Al (K-8.34A) | Fe (K-1.94A) | 4.3 |
| 2 | Al (K-8.34A) | Cu (K-1.54A) | 5.4 |
| 3 | Mg (K-9.89A) | Ag (L-4.15A) | 2.4 |
| 4 | Al (K-8.34A) | Ag (K-0.48A) | 17.4 |
| 5 | Al (K-8.34A) | Mo (K-0.71A) | 11.7 |

Combinations No. 1, 2 and 3 of Table II were tried experimentally. The preferred combination of these appear to be Al–Cu because of the ease of fabrication, good thermal conductivity, resistance to electron bombardment erosion and ease of filtering. In addition, a very favorable wavelength ratio of 5.4 is achieved with the Al–Cu combination.

Combinations No. 4 and 5, Table II, have wavelength ratios of 17.4 and 11.7, respectively, which can be very valuable in providing wide separation of the patterns of the crystallographic and supramolecular orders. In many cases, however, the short wavelengths of Ag(K-0.48A) and Mo(K-0.71A) do not provide as favorable a dispersion as that from Cu (K = 1.54A) for study of the crystallographic structure. In some instances, these shorter wavelengths are preferred, because of the larger number of recorded reflections produced, thereby providing more data for structure analysis. However, experience to date indicates that the combination Al–Cu is especially effective for the analysis of polymeric materials.

Various structural forms can be used for an Al–Cu target. Thus, a conical cavity design such as that taught in U.S. Pat. No. 3,502,925 supra can be fabricated from an Al–Cu alloy. However, the preferred fabrication is that shown in FIG. 2A in which target block 22 is aluminum and plug 26 is Cu. This choice is selected because aluminum is somewhat easier to machine than copper, and using readily available base metals eliminates the need to find or fabricate a suitable alloy. It will be understood that a target block 22 of copper and a plug 26 of aluminum is equally functional.

Figure 2B:
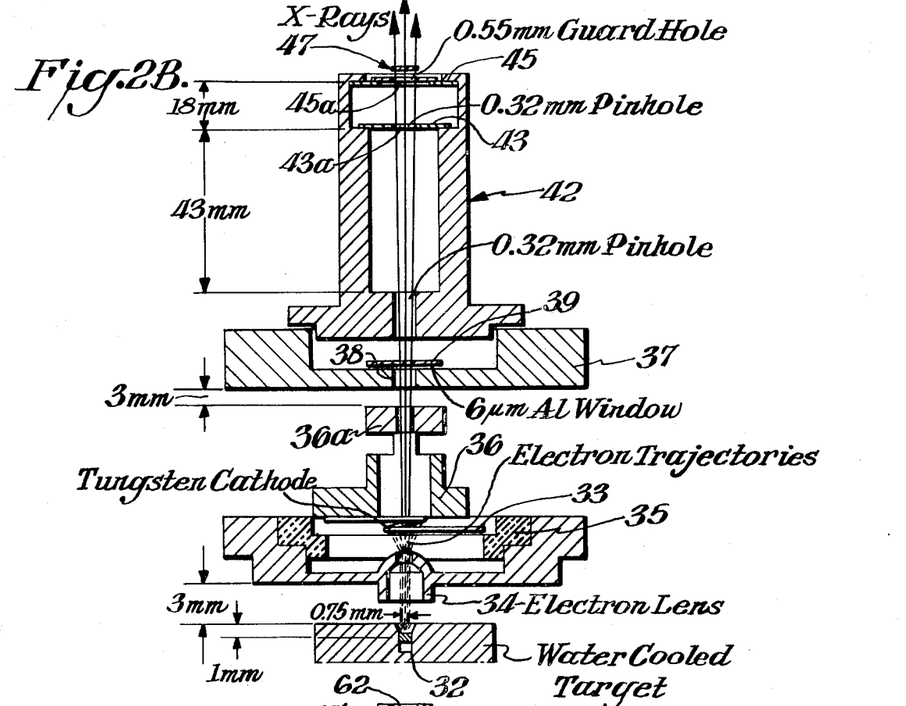
FIG. 2B is a partially schematic side elevation exploded sectional view of an X-ray source embodying the target of FIG. 2A.

A typical diffraction analysis apparatus is shown schematically (with some dimensions purposely exaggerated for clarity) and in exploded representation in FIG. 2B, in which the water-cooled target, denoted generally at 32, is constructed as detailed in FIG. 2A. It will be understood that the entire assembly is housed within an evacuated chamber, omitted from the showing for simplification.

The cathode element 33 is shown as a single coil of wire which is heated from a current source not detailed to emit an electron stream, shown in broken line representation, which is focused by the electron lens 34 to form a beam about 0.75 mm. dia. impinging on the target.

The analytical X-radiation resulting from the electron bombardment is emitted upwardly from target 32 and passes through a metallic ring 36 surmounted by a collimator 36a, both electrically insulated from lens 34 by insulator 35. The radiation passes thence into the superstructure comprising a base piece 37 provided with a central passage 38 through which the radiation continues thence through an aluminum foil window 39, typically 6μm thick, then on into the tubular sample holder denoted generally at 42. Holder 42 supports a drilled ring 43, typically a 10 mm. diameter tantalum disc 0.5 mm. thick formed with a pinhole aperture 43a typically 0.32 mm. dia., and, spaced therefrom, a similar 10 mm. diameter, 0.5 mm. thick tantalum guard ring 45 having a central aperture 45a typically 0.55 mm. dia. on the top surface of which the sample 47 to be examined is placed. The distance from the target to the sample in the assembled source unit is, typically, 85 mm.

Figure 3:
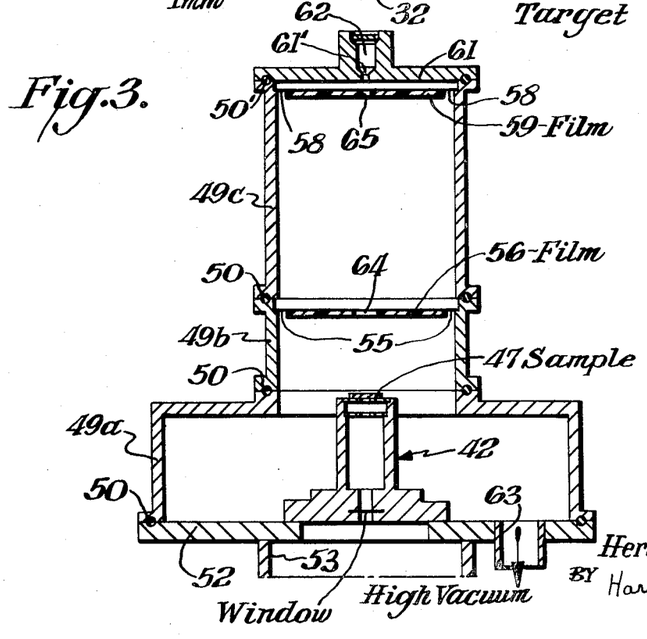
FIG. 3 is a partially schematic side-elevational, cross-sectional view of a preferred embodiment of camera for the simultaneous recording of wide angle and small angle diffraction patterns.

FIG. 3 shows schematically a multipurpose camera which facilitates the simultaneous recording of wide angle and small angle diffraction patterns from a sample irradiated with a dual wavelength X-ray beam.

The camera is preferably fabricated as a multiplicity of cylindrical sections 49a–49c, inclusive, stacked vertically one on the other, each sealed vacuum-tight from its neighbors by O-rings 50. Lowermost section 49a rests on the upper cover plate 52 of the source apparatus vacuum-tight housing 53. Thus, tubular sample holder 42 extends into section 49a, with alignment along the longitudinal vertical axis of the camera.

Cylindrical section 49b is typically 5 cm. long and is provided with an internal shoulder 55 which supports and centers the lower film 56 in proper position. Upper cylindrical section 49c is typically 12.5 cm. long and is provided with an internal shoulder 58 which supports and centers the upper film 59 in proper position.

Camera lid 61 is sealed vacuum tight in its joint with the upper end of cylindrical section 49c by O-ring 50'. In the center of lid 61 is an opening 61' into primary beam catching cavity 62.

When using X-radiation with wavelengths 3A and longer the absorption of the radiations in air becomes significant. Therefore, the camera assembly is provided with a high vacuum connection 63, the O-rings 50,50' providing vacuum sealing at the several section joints.

The camera of FIG. 3 can be used in several modes for simultaneous recording of wide angle and small angle diffraction patterns. Thus, a single combined record will be obtained by placing a photographic film 56 on internal shoulder 55. A hole 64, typically 3 mm. in diameter, permits the collimated primary beam to pass through the film. Wide angle diffraction images caused by interaction of the short wavelength radiation with the periodicities of the crystallographic order of a sample 47 placed at the upper end of holder 42 will be recorded on film 56, and small angle diffraction images from interaction of the long wavelength radiation with the supramolecular structural order will also be recorded on film 56, with the latter, however, located close to the primary beam-passing hole 64.

Figure 4:
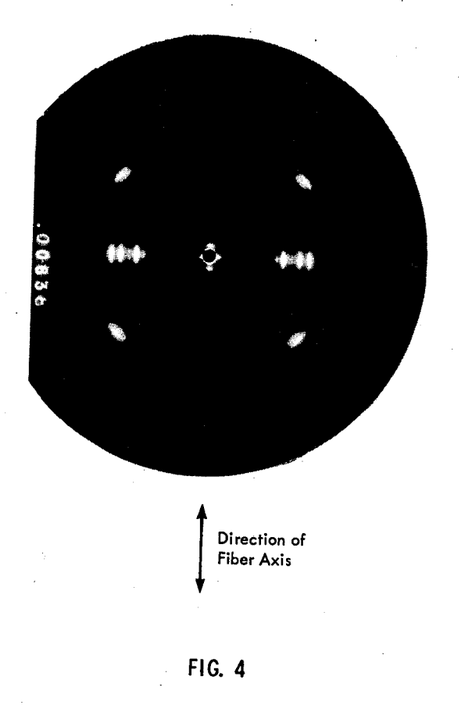
FIG. 4 is a typical photographic record of combined dual wavelength diffraction patterns of a polypropylene fiber.

FIG. 4 is a combined pattern of this type formed by irradiating a polypropylene fiber sample with emission from an Al–Fe cavity target constructed according to FIG. 2A, plug 26 being iron. The target emission wavelengths were 1.95A (Fe) and 8.34A (Al) and the pattern shown was produced with a 3-hour exposure with a tube energized at 20kV and a target current of 2 ma. The sample to-film distance was 5 cm. The direction of the fiber axis is indicated by the arrow drawn adjacent the photograph.

Figure 5:
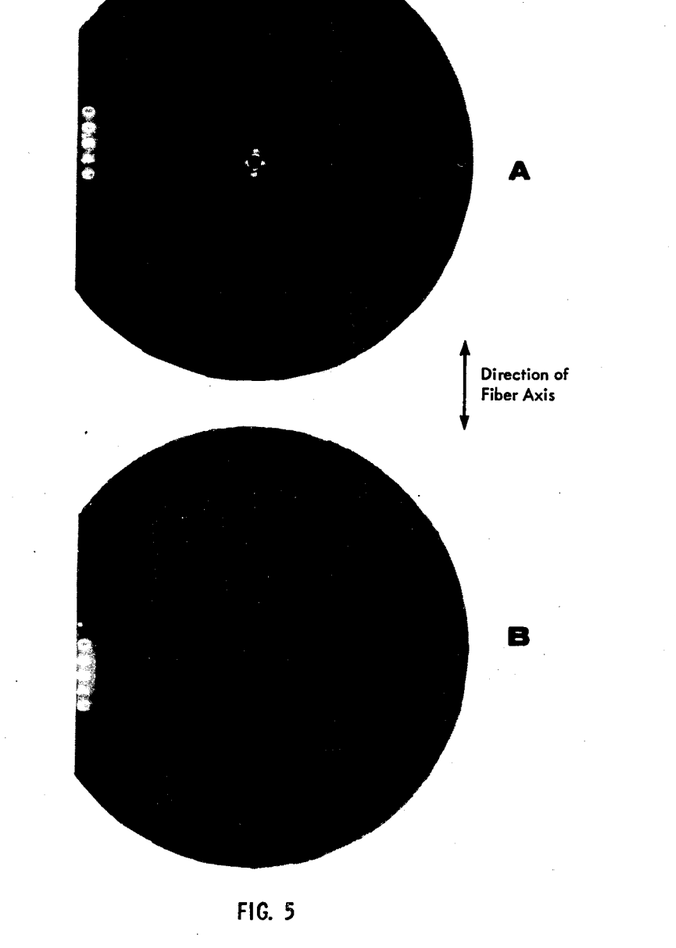
FIGS. 5A and 5B are typical "back-to-back" photographic records of dual wavelength diffraction patterns of a polypropylene fiber.

If two pieces of centrally apertured film are placed on shoulder 55 in back-to-back relationship and an exposure made as hereinbefore described for FIG. 4 but using a Cu-Al target with emission wavelengths of 1.54A (Cu plug) and 8.34A (Al bore) the layer of film nearest to the sample 47 absorbs the longer wavelength to a greater degree. Upon examination of the two films, a differentiation between the pattern caused by each wavelength can be readily distinguished. This is shown in FIG. 5, wherein FIG. 5A is the combined diffraction pattern from both wavelengths recorded on the film nearest to the sample, whereas FIG. 5B shows the back-up film. It is apparent that the small angle pattern characteristic of the supramolecular structure close to primary beam hole 64 is not present in FIG. 5B, whereas the large angle pattern characteristic of the atomic crystallographic order is still recorded, although faintly at the three-hour exposure time resorted to here. In addition, some clarity of pattern is lost in the photo-development process.

Figure 6:
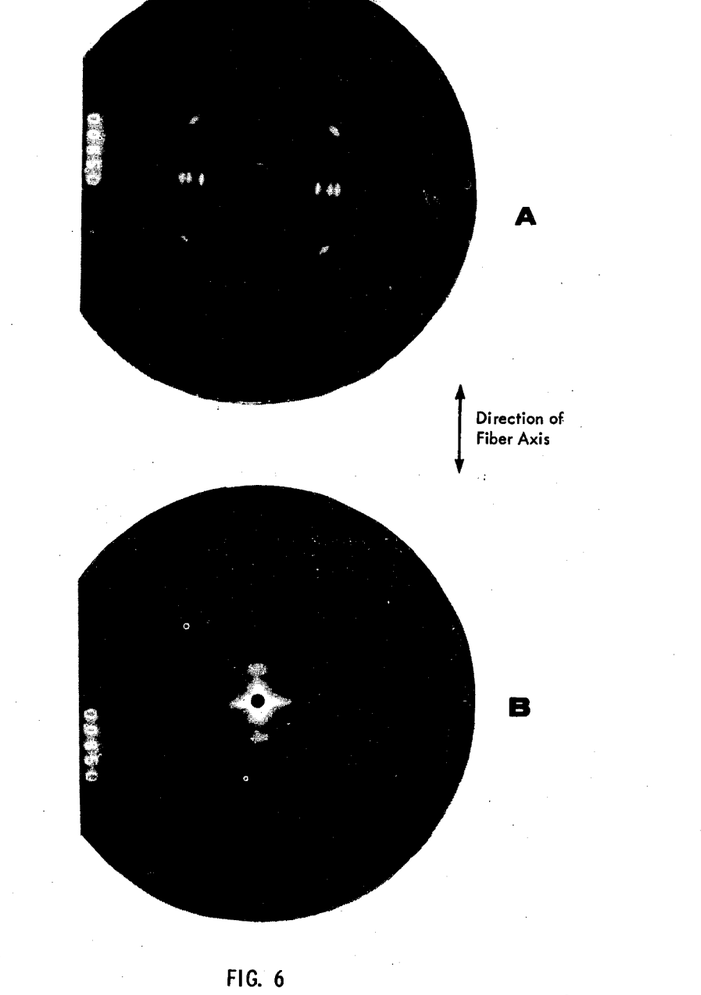
FIGS. 6A and 6B are typical photographic records of individual dual wavelength diffraction patterns of polypropylene fiber recorded simultaneously on films disposed at spaced locations.

The small angle diffraction pattern is limited to the small central region of the photographs of FIG. 4 and 5A. However, if the exposure is made on film 59 supported on shoulder 58, a distance 17.5 cm. from the sample 47, the spacing and size of the diffraction images will be increased by an amount 17.5/5, or 3.5 times. This enlargement is advantageous for the small angle diffraction but unnecessary for the wide angle pattern. Therefore, if, in addition to film 59 on shoulder 58, a film 56 is placed on shoulder 55, with hole 64 enlarged to about 10 mm. diameter, the small angle diffraction beams and the primary beam with both clear hole 64. As shown in FIG. 6B, the small angle diffraction data exhibits enhanced resolution by recording the beam passing through hole 64 on the more distant film 59 located at internal shoulder 58. Hole 65 in film 59 is typically 3 mm. diameter, to allow the primary beam to pass through and be trapped in cavity 62.

To avoid confusion or error that could arise from attributing interference maxima to diffraction of the wrong wavelength, suitably apertured back-to-back films can be placed on shoulder 55, as in the example described for FIG. 5. Then, the shorter wavelength radiation with its greater penetrating power will pass through the film nearest the sample and will expose the second, back-up film with less attenuation, thereby identifying without question the diffraction pattern attributable to the shorter wavelength radiation. In this manner also, the proper diameter of the hole 64 in the film 56 nearest the sample can be determined to assure the passage of all the small angle diffraction pattern to be recorded on the more distant film 59.

The patterns shown in FIGS. 6A and 6B were obtained viewing the same polypropylene fiber sample as in FIG. 4 but using an Al bore 8.34A - Cu plug 1.54A target with the tube energized at 19kV, a target current of 2 ma and an exposure time of 15 hours.

Figure 7:
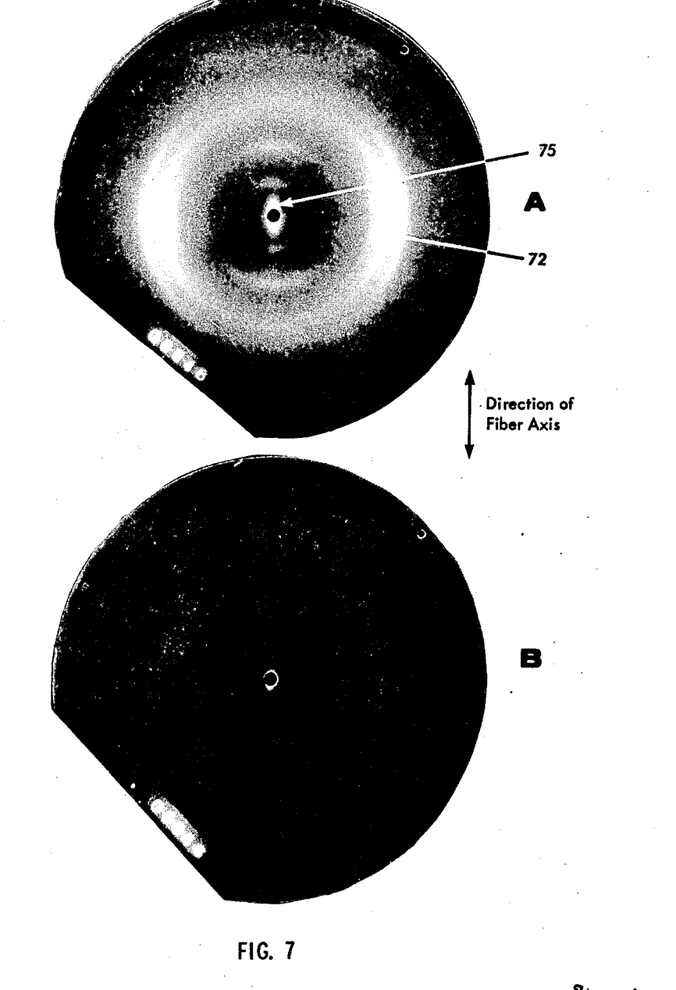
FIGS. 7A and 7B are typical back-to-back photographic records of dual wavelength diffraction patterns of an untreated polyamide fiber.
Figure 8:
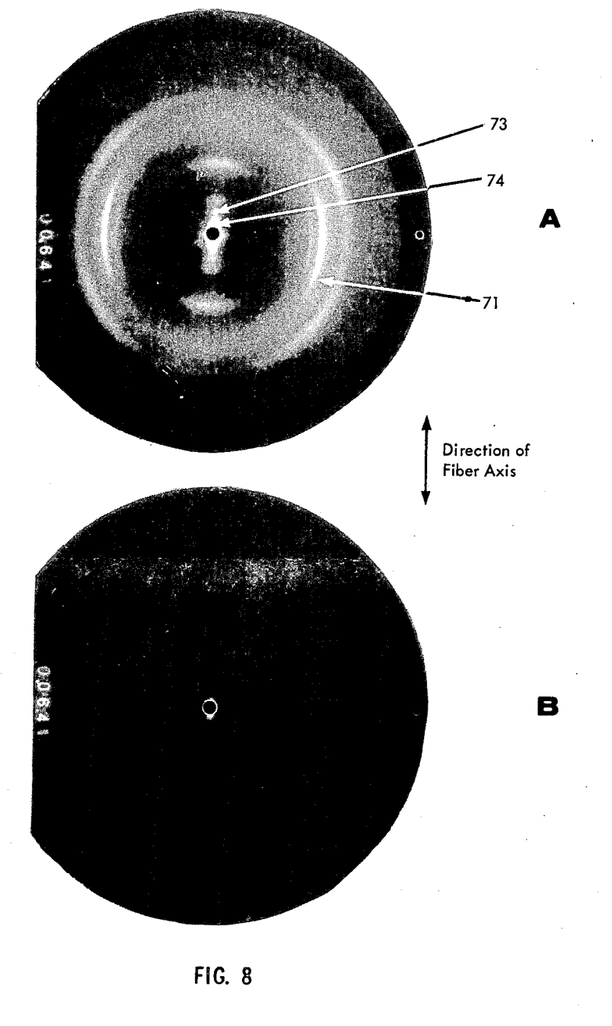
FIGS. 8A and 8B are typical back-to-back photographic records of dual wavelength diffraction patterns of an acid-treated polyamide fiber.

An example of the utility of my method of dual wavelength analysis for product characterization is shown in FIGS. 7 and 8, which give patterns obtained from a hollow polyamide fiber. FIG. 7A shows patterns recorded from the fiber before an acid treatment, FIG. 7B being the backwardly oriented film of the pair identifying the short wavelength diffraction pattern with absolute certainty.

FIG. 8A is a dual wavelength pattern of the same fiber after an acid treatment, FIG. 8B being the backwardly oriented film of the pair again verifying the short wavelength pattern. These patterns in FIG. 8 and those in FIG. 7 were produced using an Al bore 8.34A-Fe plug 1.94A target.

It can be seen that acid treatment affects both the crystallographic and the supramolecular orders of the fiber. Thus, in the short wavelength pattern recording crystallographic structural information, the circular arcs 71 of the treated fiber in FIG. 8A are of a significantly smaller subtended angle than the corresponding circular arcs 72 in the pattern of the untreated fiber in FIG. 7A. In addition, the supramolecular order of the treated fiber has become more periodic, as evidenced by the long wavelength maxima 73 appearing with plume 74 in FIG. 8A. These maxima do not appear with plume 75 from the long wavelength diffraction of the untreated fiber of FIG. 7A.

One problem which is to be anticipated in X-ray analysis is that arising out of coexisting radiations contributed by target materials which simultaneously emit more than a single wavelength when bombarded. In all of the examples reported supra, applicant encountered no interference from this cause. In part, this was undoubtedly due to the radiation-selective absorption effect of the aluminum foil window 39. However, advantage is also taken of disproportionate intensities, e.g., the relatively high proportional intensity of Cu K radiation as compared with Cu L radiation.

What is claimed is:

1. A method of dual wavelength X-ray analysis for the simultaneous investigation of the existing atomic crystallographic order and supramolecular order of a sample material comprising concurrently irradiating said sample material with two well-collimated, high intensity, substantially coincident and monochromatic X-ray beams, one of said beams having a preselected relatively short wavelength in the range of about 0.48A to 2.0A producing a diffraction pattern characteristic primarily of said atomic crystallographic order of said sample material and the other of said beams having a preselected relatively long wavelength greater than 4.0A producing a diffraction pattern characteristic primarily of said supramolecular order of said sample material, and recording each said diffraction pattern.

2. A method of dual wavelength X-ray analysis for the simultaneous investigation of the existing atomic crystallographic order and supramolecular order of a sample material according to claim 1 wherein said beam of relatively short wavelength is in the wavelength range of about 0.48A to about 1.94A, whereas said beam of relatively long wavelength is in the wavelength range of about 8.34A to about 9.89A.

3. A method of dual wavelength X-ray analysis for the simultaneous investigation of the existing atomic crystallographic order and supramolecular order of a sample material according to claim 1 wherein said beam of relatively short wavelength is K radiation emitted during electron bombardment of a member of the group Ag, Mo, Cu and Fe, whereas said beam of relatively long wavelength is K radiation emitted during electron bombardment of a member of the group Al and Mg.

4. A method of dual wavelength X-ray analysis for the simultaneous investigation of the existing atomic crystallographic order and supramolecular order of a sample material according to claim 1 wherein said recording is accomplished photographically by employing a pair of photosensitive media disposed in back-to-back relationship one with another across the path of radiation diffracted by said sample material, thereby recording said diffraction pattern characteristic primarily of said atomic crystallographic order together with said diffraction pattern characteristic primarily of said supramolecular order on the first photosensitive medium nearest to said sample material and simultaneously recording the diffraction pattern characteristic primarily of said atomic crystallographic order in relatively less attenuated form than said diffraction pattern primarily of said supramolecular order on the second photosensitive medium disposed behind and adjacent to said first photosensitive medium.

5. A method of dual wavelength X-ray analysis for the simultaneous investigation of the existing atomic crystallographic order and supramolecular order of a sample material according to claim 1 wherein said recording is accomplished photographically by employing a pair of photo-sensitive media disposed across the path of radiation diffracted by said sample material, the photosensitive medium nearest said sample material being suitably apertured in the region traversed by radiation characteristic of said supramolecular order together with primary beam radiation, whereupon the wide angle diffracted radiation characteristic primarily of said atomic crystallographic order of said sample is individually recorded on said photosensitive medium nearest said sample material while the small angle diffracted radiation characteristic primarily of said supramolecular order of said sample is individually recorded to enlarge scale on said photosensitive medium remote from said sample material.

6. Apparatus for the dual wavelength simultaneous X-ray investigation of the existing atomic crystallographic order and supramolecular order of a sample material comprising, in combination, within an evacuated housing, electron bombardment means directed toward a target emitting two well-collimated, high intensity substantially coincident and monochromatic X-ray beams, one of said beams having a preselected relatively short wavelength in the range of about 0.48A to 2.0A producing a diffraction pattern characteristic primarily of said atomic crystallographic order of said sample material and the other of said beams having a preselected relatively long wavelength greater than 4.0A producing a diffraction pattern characteristic primarily of said supramolecular order of said sample material, sample material support means disposed in the path of radiation emitted by said target, and diffraction pattern recording means disposed in straight line prolongation with said target and said sample support means.

7. Apparatus for the dual wavelength simultaneous X-ray investigation of the existing atomic crystallization order and supramolecular order of a sample material according to claim 6 wherein said target is fabricated from a first preselected metal which, under electron bombardment emits one of said X-ray beams, said target being machined with a tubular bore which is counterbored for part of the length to provide a frusto-conical opening disposed toward said sample material, and a plug mounted within said tubular bore of said target block fabricated from a second preselected metal which, under electron bombardment, emits the other of said X-ray beams.

8. Apparatus for the dual wavelength simultaneous X-ray investigation of the existing atomic crystallographic order and supramolecular order of a sample material comprising, in combination, within an evacuated housing, electron bombardment means directed toward a target emitting two well-collimated, high intensity substantially coincident and monochromatic X-ray beams, one of said beams having a preselected relatively short wavelength in the range of about 0.48A to 2.0A producing a diffraction pattern characteristic primarily of said atomic crystallographic order of said sample material and the other of said beams having a preselected relatively long wavelength greater than 4.0A producing a diffraction pattern characteristic primarily of said supramolecular order of said sample material, sample material support means disposed in the path of radiation emitted by said target, and diffraction pattern recording means employing a goniometric scanner provided with digital counting means.

9. Apparatus for the dual wavelength simultaneous X-ray investigation of the existing atomic crystallographic order and supramolecular order of a sample material according to claim 8 provided with recording means responsive to said digital counting means.

* * * * *